US012665375B2

(12) United States Patent
Takeshita et al.

(10) Patent No.: US 12,665,375 B2
(45) Date of Patent: Jun. 23, 2026

(54) OPTICAL AMPLIFICATION DEVICE AND OPTICAL AMPLIFICATION METHOD

(71) Applicant: NEC Corporation, Tokyo (JP)

(72) Inventors: Hitoshi Takeshita, Tokyo (JP); Keiichi Matsumoto, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 910 days.

(21) Appl. No.: 17/921,681

(22) PCT Filed: May 8, 2020

(86) PCT No.: PCT/JP2020/018619
§ 371 (c)(1),
(2) Date: Oct. 27, 2022

(87) PCT Pub. No.: WO2021/224977
PCT Pub. Date: Nov. 11, 2021

(65) Prior Publication Data
US 2023/0163552 A1 May 25, 2023

(51) Int. Cl.
*H01S 3/067* (2006.01)
*H01S 3/094* (2006.01)
*H01S 3/16* (2006.01)

(52) U.S. Cl.
CPC ...... *H01S 3/06737* (2013.01); *H01S 3/06733* (2013.01); *H01S 3/094007* (2013.01);
(Continued)

(58) Field of Classification Search
CPC .......... H01S 3/06737; H01S 3/094011; H01S 3/094015
See application file for complete search history.

(56) References Cited

U.S. PATENT DOCUMENTS 6,333,810 B1    12/2001   Yoon
6,459,528 B1 *  10/2002   Cao ..................... H01S 3/06754
                                                          359/341.2
(Continued)

FOREIGN PATENT DOCUMENTS

JP        H05-243656 A    9/1993
JP        H10-107351 A    4/1998
(Continued)

OTHER PUBLICATIONS

International Search Report for PCT Application No. PCT/JP2020/018619, mailed on Jul. 14, 2020.
(Continued)

*Primary Examiner* — Deandra M Hughes

(57) ABSTRACT

The present invention addresses the problem that, when an optical amplification device having a plurality of optical transmission paths, such as multi-core optical fibers, is used for bidirectional communication, it is difficult to construct an optical transmission system optimized for all of signal lights having different transmission directions. The optical amplification device of the present invention comprises: an optical guide means having a plurality of optical transmission paths including an optical amplification medium having a gain in the wavelength band of a signal light; an excitation light introducing means for introducing excitation light for exciting the optical amplification medium into the optical guide means from both ends of the optical guide means; and a residual excitation light introducing means for introducing residual excitation light output from both ends of the optical guide means and having a wavelength component of the excitation light into the optical guide means.

20 Claims, 7 Drawing Sheets

(52) U.S. Cl.
CPC .. *H01S 3/094011* (2013.01); *H01S 3/094015*
(2013.01); *H01S 3/1608* (2013.01)

(56) References Cited

U.S. PATENT DOCUMENTS

| | | | | |
|---|---|---|---|---|
| 6,487,006 | B1 * | 11/2002 | Chen ................. | H01S 3/094003 |
| | | | | 359/341.32 |
| 6,781,749 | B2 * | 8/2004 | Radic ................. | G02B 6/29386 |
| | | | | 359/341.2 |
| 9,762,020 | B1 * | 9/2017 | Stampoulidis ...... | H01S 3/06766 |
| 10,348,051 | B1 * | 7/2019 | Shah ...................... | G01S 17/34 |
| 2007/0236781 | A1 * | 10/2007 | Fidric ................. | H01S 3/09415 |
| | | | | 359/341.3 |
| 2017/0063463 | A1 * | 3/2017 | Zhang ................... | H01S 3/1608 |
| 2017/0155225 | A1 * | 6/2017 | Villeneuve .......... | H01S 3/06754 |
| 2020/0412079 | A1 * | 12/2020 | Matsumoto ........... | H01S 3/0941 |
| 2021/0057869 | A1 * | 2/2021 | Takeshita ........... | H01S 3/06737 |
| 2021/0399514 | A1 * | 12/2021 | Takeshita ........... | G02B 6/02042 |
| 2022/0337025 | A1 * | 10/2022 | Aozasa .................... | G02B 6/02 |
| 2025/0105578 | A1 * | 3/2025 | Sakamoto ........... | H01S 3/06754 |
| 2025/0329985 | A1 * | 10/2025 | Poulton .................. | H01S 5/026 |
| 2025/0329989 | A1 * | 10/2025 | Poulton ................ | H01S 5/2018 |

FOREIGN PATENT DOCUMENTS

| | | |
|---|---|---|
| JP | 6261810 B | 11/2018 |
| WO | 2019/117314 A1 | 6/2019 |
| WO | 2019/198663 A1 | 10/2019 |

OTHER PUBLICATIONS

English translation of Written opinion for PCT Application No.
PCT/JP2020/018619, mailed on Jul. 14, 2020.

* cited by examiner

OPTICAL AMPLIFICATION DEVICE AND OPTICAL AMPLIFICATION METHOD

This application is a National Stage Entry of PCT/JP2020/018619 filed on May 8, 2020, the contents of all of which are incorporated herein by reference, in their entirety.

TECHNICAL FIELD

The present invention relates to an optical amplification device and an optical amplification method, more particularly to an optical amplification device and an optical amplification method that use multi-core optical fibers.

BACKGROUND ART

Due to rapid expansion of mobile traffic and video services and the like, there has been demanded an extension of a communication capacity for a core network. Such a demand for a capacity extension tends to persist on a continuous basis. Hitherto, an extension of a communication capacity has been achieved by utilizing a time multiplexing technique and a wavelength multiplexing technique. The time multiplexing technique and the wavelength multiplexing technique have been applied to an optical communication system utilizing single-core optical fibers.

When single-core optical fibers are used, the multiplex number of optical signals that can be transmitted through a single core, i.e., a single optical fiber core, is limited, and the number has nearly reached the limitation in recent years. The limitation in the multiplex number depends on a wavelength bandwidth that can be used in optical fiber communication and a proof stress for input optical intensity of a single-core optical fiber.

In such a situation, in order to further extend a communication capacity, there has been developed a space multiplexing technique being a multiplexing technique different from conventional multiplexing techniques. The space multiplexing technique involves a multi-core technique of increasing the number of cores for one optical fiber and a multi-mode technique of increasing the number of propagation modes. The numbers of cores and modes that are used in conventional optical fiber communication are both one. Thus, the communication capacity can be significantly extended by increasing the numbers of cores and modes.

However, when the numbers of cores and modes of the optical fiber are increased, optical transceivers and optical amplifiers that are widely used today cannot be used as is. The reason is that the optical transceivers and the optical amplifiers that are widely used today are developed for single-core optical fibers, and are incompatible with multi-core optical fibers or multi-mode optical fibers. Thus, there has been proposed a technique of achieving an optical transceiver and an optical amplifier that are suitable for a multi-core optical fiber or a multi-mode optical fiber.

As an optical amplification method suitable for a multi-core optical fiber, two methods including a core excitation method and a clad excitation method are known. In the core excitation method, intensity of an optical signal being optically transmitted through each core is individually amplified through use of an individual excitation light source for each core. In the clad excitation method, intensity of an optical signal being optically transmitted through each core is correctively amplified through use of a common excitation light source.

In order to efficiently amplify optical intensity of an optical signal to be transmitted through a multi-core optical fiber, the clad excitation method is preferable, in which intensity of an optical signal being optically transmitted through each core is collectively amplified through use of a common excitation light source. Further, in the clad excitation method, in principle, a configuration of a conventional optical amplifier adopting a single-core excitation method can be used as is as a configuration of an optical amplifier adopting the clad excitation method.

PTL 1 describes an example of such an optical amplifier adopting the clad excitation method. An optical amplifier 10 of the related art, which is described in PTL 1, includes seven optical isolators 1, an optical fiber fan-in (FAN-IN) 2, a semiconductor laser 3, a first optical coupler 4, a multi-core EDF 5, a second optical coupler 6, a pump stripper 7, an optical fiber fan-out (FAN-OUT) 8, and seven optical isolators 9.

Herein, the first optical coupler 4 includes a main optical fiber 4a, an excitation light input/output optical fiber 4b, an excitation light supply optical fiber 4c, and a protector 4d. Further, the second optical coupler 6 includes a main optical fiber 6a, an excitation light input/output optical fiber 6b, and a protector 6d.

With the optical amplifier 10 of the related art, among excitation light being output from the semiconductor laser 3 and supplied to the multi-core EDF 5 via the first optical coupler 4, at least part of excitation light that does not contribute to optical excitation in the multi-core EDF 5 is collected by the second optical coupler 6. The collected excitation light passes through the excitation light input/output optical fiber 6b and the excitation light input/output optical fiber 4b, is input to the first optical coupler 4, is regenerated as excitation light, and is supplied to the multi-core EDF 5 again. It is assumed that, with this configuration, excitation efficiency in the optical amplifier 10 of the related art can be improved.

CITATION LIST

Patent Literature

[PTL 1] International Publication No. WO 2019/117314

SUMMARY OF INVENTION

Technical Problem

As described above, the optical amplifier of the related art has a configuration in which each signal light that passes through each of the optical isolators and propagates in a single direction through each of core parts of multi-core fibers is amplified by front excitation of a multi-core optical amplification fiber. When such a front excitation type multi-core optical fiber amplifier is used in a bidirectional multi-core optical fiber transmission system in which a transmission direction is core-specific, a reachable distance of signal light differs according to a transmission direction of the signal light propagating through each core. The reason for this is described below.

When the optical fiber amplifier is a front excitation type in which propagation directions of signal light and excitation light are the same, an inverted distribution is largely formed in the vicinity of a signal light incidence end, hence a high amplification effect and a low noise index are achieved. Meanwhile, in a rear excitation type in which propagation directions of signal light and excitation light are each opposite to each other, an inverted distribution is reduced in the vicinity of a signal light incidence end, hence a noise index is degraded.

Herein, when the above-mentioned multi-core optical fiber amplifier is used in a bidirectional multi-core optical fiber transmission system, the front excitation type is adopted for forward transmission signal light that propagates in the same direction as a propagation direction of excitation light. Meanwhile, the rear excitation type is adopted for backward transmission signal light that propagates in a direction opposite to a propagation direction of excitation light. As a result, the noise index differs according to the excitation direction, hence a reachable distance of the backward transmission signal light is shorter than a reachable distance of the forward transmission signal light. Thus, an optical transmission system needs to be designed according to the shorter reachable distance for bidirectional communication, which is excessive performance for the forward transmission signal light with a long reachable distance. Meanwhile, when an optical transmission system suitable for a longer reachable distance is designed, multi-core optical fiber amplifiers for different transmission directions are required, resulting in a complicated configuration.

Therefore, there is a problem that, when an optical amplification device including a plurality of optical transmission paths such as multi-core optical fibers is used in bidirectional communication, it is difficult to establish an optical transmission system being optimal for any signal light with different transmission directions.

An object of the present invention is to provide an optical amplification device and an optical amplification method that solve the above-mentioned problem.

Solution to Problem

An optical amplification device according to the present invention includes an optical waveguiding means including a plurality of optical transmission paths containing an optical amplification medium having a gain in a wavelength band of signal light, an excitation light introducing means for introducing, to the optical waveguiding means, excitation light that excites the optical amplification medium, from both ends of the optical waveguiding means, and a residual excitation light introducing means for introducing, to the optical waveguiding means, residual excitation light being output from both the ends of the optical waveguiding means and having a wavelength component of the excitation light.

An optical amplification method according to the present invention includes introducing signal light to a plurality of optical transmission paths containing an optical amplification medium having a gain in a wavelength band of the signal light, introducing, to the plurality of optical transmission paths, excitation light that excites the optical amplification medium, from both ends of the plurality of optical transmission paths, and introducing, to the plurality of optical transmission paths, residual excitation light being output from both the ends of the plurality of optical transmission paths and having a wavelength component of the excitation light.

Advantageous Effects of Invention

With the optical amplification device and the optical amplification method according to the present invention, even when an optical amplification device including a plurality of optical transmission paths is used in bidirectional communication, an optical transmission system being optimal for any signal light with different transmission directions can be established.

EXAMPLE EMBODIMENT

With reference to the drawings, example embodiments of the present invention are described below.

First Example Embodiment

Figure 1:
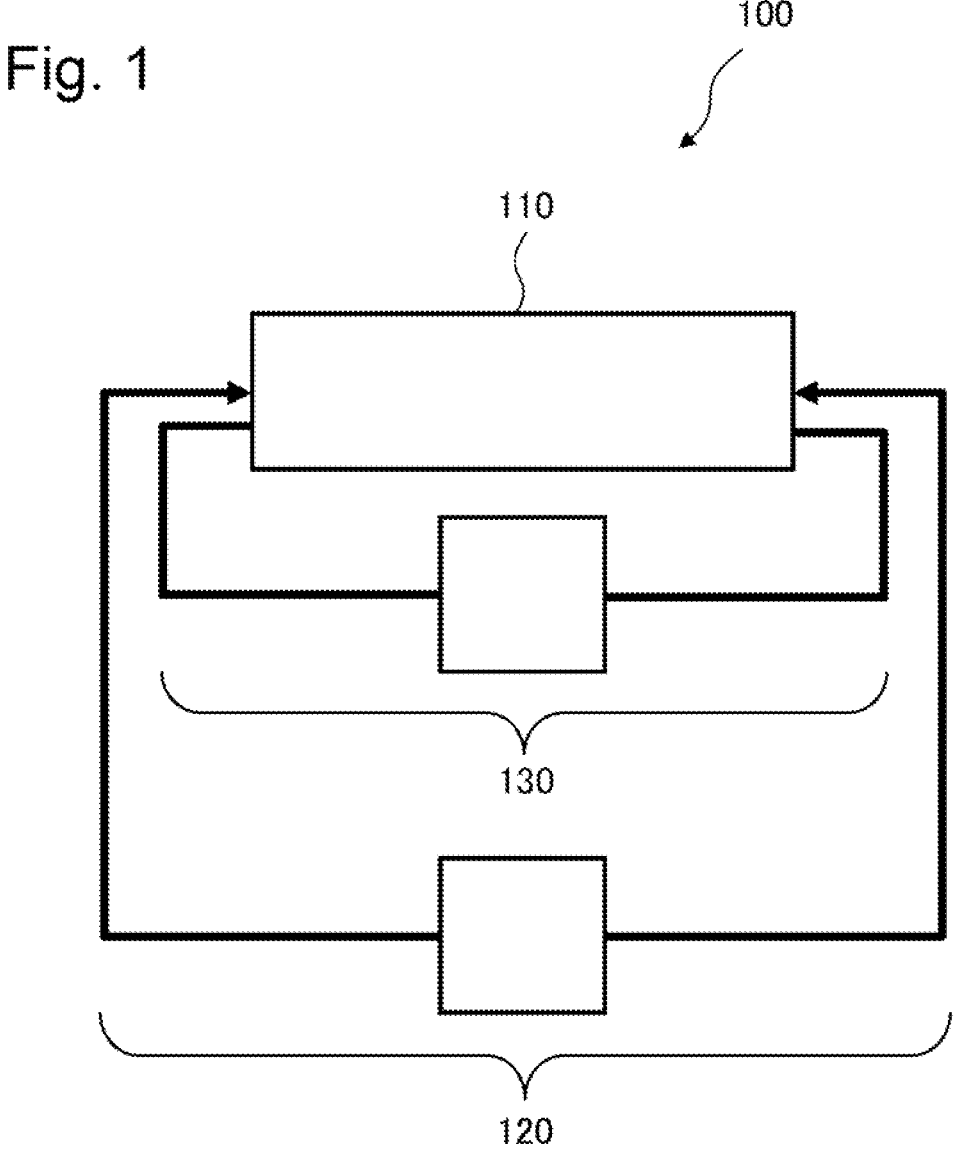
FIG. 1 is a block diagram illustrating a configuration of an optical amplification device according to a first example embodiment of the present invention.

FIG. 1 is a block diagram illustrating a configuration of an optical amplification device 100 according to a first example embodiment of the present invention. The optical amplification device 100 includes an optical waveguiding unit (optical waveguiding means) 110, an excitation light introducing unit (excitation light introducing means) 120, and a residual excitation light introducing unit (residual excitation light introducing means) 130.

The optical waveguiding unit 110 includes a plurality of optical transmission paths containing an optical amplification medium having a gain in a wavelength band of signal light. The excitation light introducing unit 120 introduces, to the optical waveguiding unit 110, excitation light for exciting the optical amplification medium, from both ends of the optical waveguiding unit 110. Further, the residual excitation light introducing unit 130 introduces, to the optical waveguiding unit 110, residual excitation light being output from both the ends of the optical waveguiding unit 110 and having a wavelength component of excitation light.

With this configuration, in the optical amplification device 100 according to the present example embodiment, optical amplification of a bidirectional excitation type is performed for any signal light propagating in different transmission directions through the plurality of optical transmission paths of the optical waveguiding unit 110. As a result, with the optical amplification device 100 according to the present example embodiment, even when the optical amplification device including the plurality of optical transmission paths is used in bidirectional communication, the optical transmission system optimal for any signal light with different transmission directions can be established.

The optical waveguiding unit 110 may be configured to include a multi-core optical fiber. In other words, the optical waveguiding unit 110 may be configured to include a multi-core optical fiber including a plurality of optical transmission paths formed of a plurality of cores, to which a rare-earth ion as an optical amplification medium is added, and a double-clad structure. In general, an erbium ion may be used as the rare-earth ion. In this case, the excitation light introducing unit 120 may be configured to introduce excitation light to the optical waveguiding unit 110 with the clad excitation method.

Herein, in general, an optical amplifier with a multi-core optical fiber has low absorption efficiency of excitation light in an optical amplification medium in a clad excitation method, hence has low amplification efficiency of optical intensity as compared to that in a core excitation method. However, the optical amplification device 100 according to the present example embodiment includes the residual excitation light introducing unit 130, hence excitation light that is not absorbed by the optical amplification medium and is output from both the ends can be re-introduced into the optical amplification medium as residual excitation light. In other words, absorption efficiency of excitation light in the optical amplification medium can be increased by reusing the excitation light introduced from both the ends. Thus, with the optical amplification device 100, high amplification efficiency can be achieved even in the clad excitation method.

Figure 2:
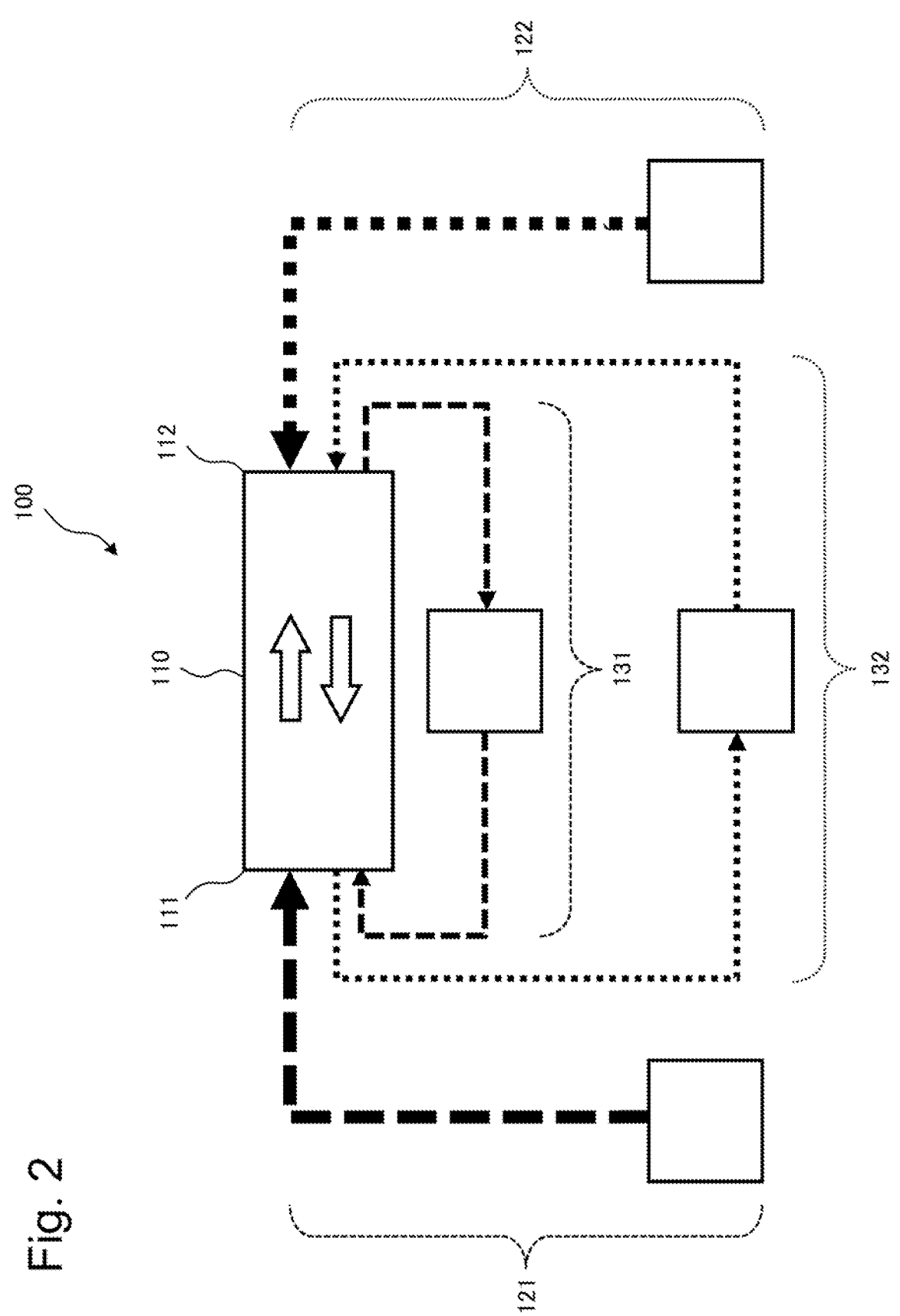
FIG. 2 is a block diagram illustrating another configuration of the optical amplification device according to the first example embodiment of the present invention.

Next, with reference to FIG. 2, the optical amplification device 100 according to the present example embodiment is further described in detail.

The optical waveguiding unit 110 may be configured to include a plurality of optical transmission paths including a first optical transmission path and a second optical transmission path. Herein, first signal light among the signal light propagates through the first optical transmission path in a first direction from a first end 111 to a second end 112 of the optical waveguiding unit 110. Meanwhile, second signal light among the signal light propagates through the second optical transmission path in a second direction from the second end 112 to the first end 111 of the optical waveguiding unit 110.

Further, as illustrated in FIG. 2, the excitation light introducing unit 120 may be configured to include a first excitation light introducing unit (first excitation light introducing means) 121 and a second excitation light introducing unit (second excitation light introducing means) 122. Herein, the first excitation light introducing unit 121 introduces first excitation light that excites the optical amplification medium, to the optical waveguiding unit 110 from the first end 111 of the optical waveguiding unit 110. The second excitation light introducing unit 122 introduces second excitation light that excites the optical amplification medium, to the optical waveguiding unit 110 from the second end 112 of the optical waveguiding unit 110.

As illustrated in FIG. 2, the residual excitation light introducing unit 130 may be configured to include a first residual excitation light introducing unit (first residual excitation light introducing means) 131 and a second residual excitation light introducing unit (second residual excitation light introducing means) 132. Herein, the first residual excitation light introducing unit 131 introduces, to the optical waveguiding unit 110 from the first end 111, first residual excitation light being output from the second end

112 of the optical waveguiding unit 110 and having a wavelength component of the first excitation light. The second residual excitation light introducing unit 132 introduces, to the optical waveguiding unit 110 from the second end 112, second residual excitation light being output from the first end 111 of the optical waveguiding unit 110 and having a wavelength component of the second excitation light.

In this manner, the optical amplification device 100 according to the present example embodiment may be configured to perform clad excitation in a bidirectional manner for the multi-core optical fiber including the cores each of which has an erbium ion added thereto and regenerating the residual excitation light in a bidirectional manner. With the configuration of exciting the multi-core optical fiber in a bidirectional manner, optical amplification performance does not differ for each of the cores even when a transmission direction of signal light differs for each of the cores of the multi-core optical fiber. Further, with the configuration of regenerating the residual excitation light in a bidirectional manner, optical amplification can efficiently be performed.

Next, an optical amplification method according to the present example embodiment is described.

First, in the optical amplification method according to the present example embodiment, signal light is introduced into a plurality of optical transmission paths containing an optical amplification medium having a gain in the wavelength band of the signal light. Further, excitation light that excites an optical amplification medium is introduced into the plurality of optical transmission paths from both ends of the plurality of optical transmission paths. Further, residual excitation light being output from both the ends of the plurality of optical transmission paths and having the wavelength component of the excitation light is introduced into the plurality of optical transmission paths.

Introduction of the signal light to the plurality of optical transmission paths, which is described above, may involve introduction of a first signal light among the signal light, to a first optical transmission path included in the plurality of optical transmission paths from a first end of the plurality of optical transmission paths. Moreover, the configuration may involve introduction of a second signal light among the signal light, to a second optical transmission path included in the plurality of optical transmission paths from a second end of the plurality of optical transmission paths.

Introduction of the excitation light to the plurality of optical transmission paths, which is described above, may involve introduction of a first excitation light, which excites the optical amplification medium, from the first end of the plurality of optical transmission paths and introduction of a second excitation light, which excites the optical amplification medium, from the second end of the plurality of optical transmission paths.

Introduction of the residual excitation light to the plurality of optical transmission paths, which is described above, may involve introduction of a first residual excitation light, which is output from the second end of the plurality of optical transmission paths and has the wavelength component of the first excitation light, from the first end to the plurality of optical transmission paths. Further, introduction of the residual excitation light to the plurality of optical transmission paths may involve introduction of a second residual excitation light, which is output from the first end of the plurality of optical transmission paths and has the wavelength component of the second excitation light, from the second end to the plurality of optical transmission paths.

Introduction of the signal light to the plurality of optical transmission paths, which is described above, may involve introduction of a signal light to the multi-core optical fiber including the plurality of optical transmission paths, formed of a double-clad structure and a plurality of cores to which a rare-earth ion is added. Further, introduction of the excitation light to the plurality of optical transmission paths may involve introduction of the excitation light to the plurality of optical transmission paths by the clad excitation method.

As described above, with the optical amplification device 100 and the optical amplification method according to the present example embodiment, even when the optical amplification device including the plurality of optical transmission paths is used in bidirectional communication, an optical transmission system optimal for any signal light with different transmission directions can be established.

Second Example Embodiment

Figure 3:
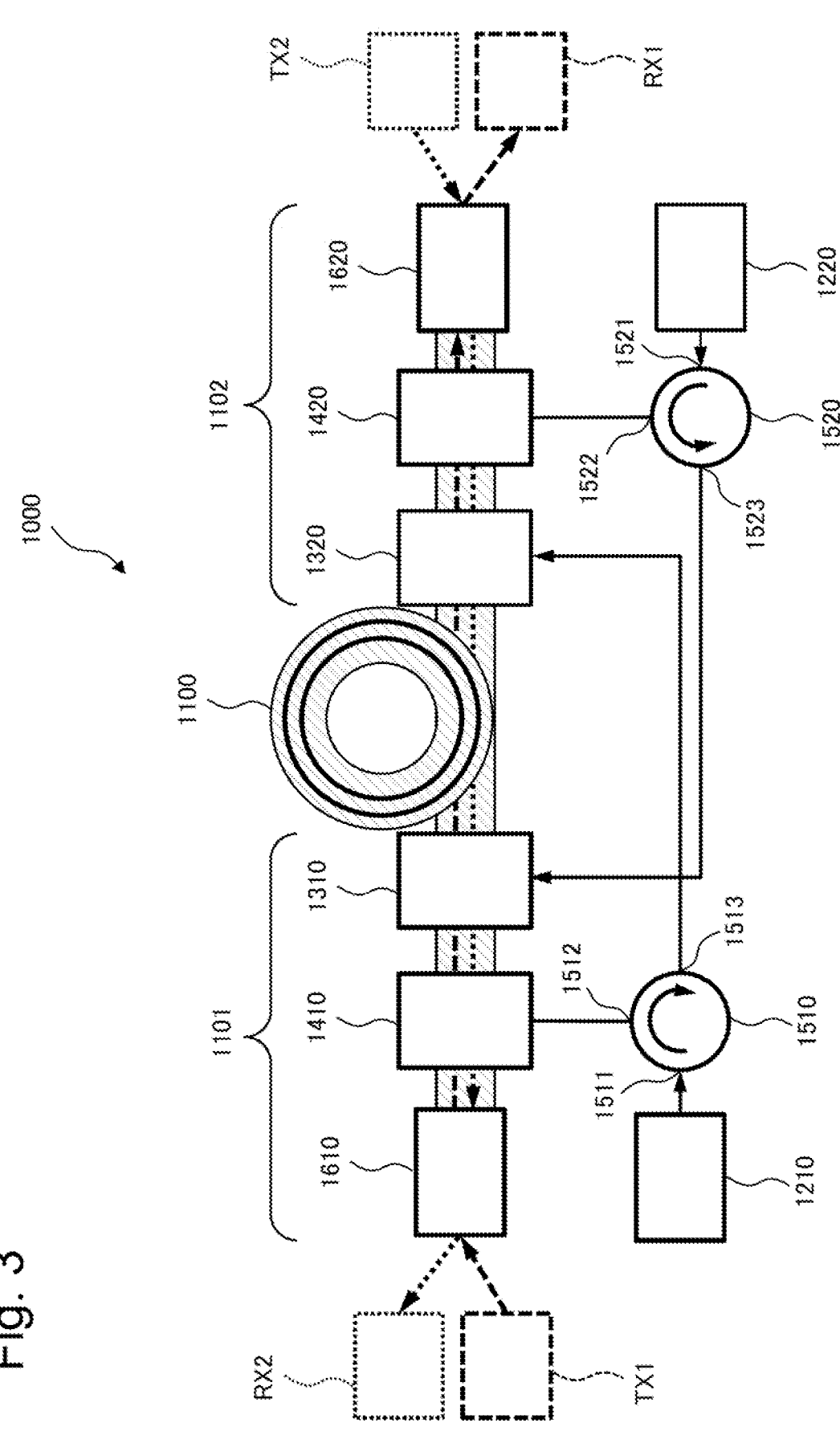
FIG. 3 is a block diagram illustrating a configuration of an optical amplification device according to a second example embodiment of the present invention.

Next, a second example embodiment of the present invention is described. FIG. 3 illustrates a configuration of an optical amplification device 1000 according to the present example embodiment.

The optical amplification device 1000 includes a multi-core erbium-doped fiber (MC-EDF) 1100 as an optical waveguiding means, a first excitation laser 1210 as a first excitation light generating means, and a second excitation laser 1220 as a second excitation light generating means. Herein, the multi-core erbium-doped fiber (MC-EDF) 1100 is a multi-core optical fiber that includes a double-clad structure and a plurality of cores to which an erbium ion being a rare-earth ion is added.

The optical amplification device 1000 further includes a first optical coupling/separating unit 1410 and a first residual excitation light coupling unit (first residual excitation light coupling means) 1310 in a path of a multi-core optical fiber 1101 connected to a first end of the multi-core erbium-doped fiber (MC-EDF) 1100. Further, the optical amplification device 1000 includes a second optical coupling/separating unit 1420 and a second residual excitation light coupling unit (second residual excitation light coupling means) 1320 in a path of a multi-core optical fiber 1102 connected to a second end of the multi-core erbium-doped fiber (MC-EDF) 1100.

FIG. 3 illustrates a configuration in which the optical amplification device 1000 includes a first fan-in/fan-out 1610 and a second fan-in/fan-out 1620. In this case, the optical amplification device 1000 is connected to a first transmitter TX1 and a second optical receiver RX2 via the first fan-in/fan-out 1610, and is connected to a second transmitter TX2 and a first optical receiver RX1 via the second fan-in/fan-out 1620. Herein, the first fan-in/fan-out 1610 connects each of the cores of the multi-core optical fiber 1101 and a single-mode fiber to each other. Further, the second fan-in/fan-out 1620 connects each of the cores of the multi-core optical fiber 1102 and a single-mode fiber to each other. With this configuration, to the optical amplification device 1000, the first signal light propagates in the first direction from the first transmitter TX1 to the first optical receiver RX1, and the second signal light propagates in the second direction from the second transmitter TX2 to the second optical receiver RX2. With this, bidirectional communication using the optical amplification device 1000 is achieved.

The first excitation laser (first excitation light generating means) 1210 generates the first excitation light. In this case, the first optical coupling/separating unit 1410 functions as a first optical coupling means for coupling the first excitation light to the multi-core erbium-doped fiber (optical waveguiding means) 1100 via the multi-core optical fiber 1101. The first excitation laser 1210 and the first optical coupling/separating unit 1410 form the first excitation light introducing means.

The second excitation laser (second excitation light generating means) 1220 generates the second excitation light. In this case, the second optical coupling/separating unit 1420 functions as a second optical coupling means for coupling the second excitation light to the multi-core erbium-doped fiber (optical waveguiding means) 1100 via the multi-core optical fiber 1102. The second excitation laser 1220 and the second optical coupling/separating unit 1420 form the second excitation light introducing means.

The first residual excitation light coupling unit 1310 is positioned on a side close to the first end, and couples the first residual excitation light to the multi-core erbium-doped fiber (optical waveguiding means) 1100. Herein, the first residual excitation light has the wavelength component of the first excitation light, and is output from the second end of the multi-core erbium-doped fiber 1100 to the multi-core optical fiber 1102. In this case, the second optical coupling/separating unit 1420 positioned on a side close to the second end functions as a first residual excitation light separating means that separates the first signal light and the first residual excitation light from each other. Further, the first residual excitation light coupling unit 1310 and the second optical coupling/separating unit 1420 form a first residual excitation light introducing means.

The second residual excitation light coupling unit 1320 is positioned on the side close to the second end, and couples the second residual excitation light to the multi-core erbium-doped fiber (optical waveguiding means) 1100. Herein, the second residual excitation light has the wavelength component of the second excitation light, and is output from the first end of the multi-core erbium-doped fiber 1100 to the multi-core optical fiber 1101. In this case, the first optical coupling/separating unit 1410 positioned on the side close to the first end functions as second residual excitation light separating means for separating the second signal light and the second residual excitation light from each other. Further, the second residual excitation light coupling unit 1320 and the first optical coupling/separating unit 1410 form the second residual excitation light introducing means.

As illustrated in FIG. 3, the optical amplification device 1000 may be configured to include a first optical control unit (first optical control means) 1510 and a second optical control unit (second optical control means) 1520.

The first optical control unit (first optical control means) 1510 includes a first terminal 1511 to which the first excitation light is input, a second terminal 1512 that outputs the first excitation light and to which the second residual excitation light is input, and a third terminal 1513 that outputs the second residual excitation light. Herein, the first optical control unit (first optical control means) 1510 forms part of the first excitation light introducing means and the second residual excitation light introducing means.

The second optical control unit (second optical control means) 1520 includes a first terminal 1521 to which the second excitation light is input, a second terminal 1522 that outputs the second excitation light and to which the first residual excitation light is input, and a third terminal 1523 that outputs the first residual excitation light. Herein, the second optical control unit (second optical control means)

1520 forms part of the second excitation light introducing means and the first residual excitation light introducing means.

Note that, in general, optical circulators may be used as the first optical control unit 1510 and the second optical control unit 1520.

Herein, the first optical coupling/separating unit 1410 and the second optical coupling/separating unit 1420 may each be a space propagation type optical coupling/separating unit (optical coupling/separating means) including a space optical system. Moreover, the first residual excitation light coupling unit (first residual excitation light coupling means) 1310 and the second residual excitation light coupling unit (second residual excitation light coupling means) 1320 may each be an optical waveguiding type residual excitation light coupling unit (residual excitation light coupling means). With this configuration, optical amplification efficiency can be maximized. The space propagation type optical coupling/separating unit may include a dichroic mirror and the optical waveguiding type residual excitation light coupling unit may include an excitation light combiner.

In place of the above-mentioned configuration, when the first residual excitation light coupling unit 1310 and the second residual excitation light coupling unit 1320 are space propagation type residual excitation light coupling units, signal light cannot pass through the multi-core erbium-doped fiber 1100 because the space propagation type includes a dichroic mirror. Further, when the first optical coupling/separating unit 1410 and the second optical coupling/separating unit 1420 are of an optical waveguiding type, the first residual excitation light is output not only to the second terminal 1522 of the second optical control unit 1520, but also to the second fan-in/fan-out 1620. In this case, power of the residual excitation light is approximately a several tens of watt (W) in general, hence the second fan-in/fan-out 1620 and the first optical receiver RX1 positioned behind are damaged. Therefore, with this configuration, it is required that a device for blocking a component of the residual excitation light that passes through the second optical coupling/separating unit 1420 be additionally provided.

Meanwhile, when the second optical coupling/separating unit 1420 includes a dichroic mirror, almost all the first residual excitation light is output to the second terminal 1522 of the second optical control unit 1520. Thus, power of the residual excitation light being output to the second fan-in/fan-out 1620 and the first optical receiver RX1 positioned behind the second optical coupling/separating unit 1420 is at a negligible level.

In this manner, it is suitable to adopt a configuration in which the first optical coupling/separating unit 1410 and the second optical coupling/separating unit 1420 are of a space propagation type including a dichroic mirror therein and the first residual excitation light coupling unit 1310 and the second residual excitation light coupling unit 1320 are of an optical waveguiding type. The first residual excitation light coupling unit 1310 and the second residual excitation light coupling unit 1320 of an optical waveguiding type allow both the signal light (in general, a wavelength of 1.5 μm) and the excitation light (in general, a wavelength of 0.98 μm) to pass therethrough.

As described above, the optical amplification device 1000 according to the present example embodiment includes the first excitation laser 1210 and the second excitation laser 1220, and is configured such that the first excitation light and the second excitation light each generated by the first excitation laser 1210 and the second excitation laser 1220 excite the multi-core erbium-doped fiber 1100 in a bidirectional manner. Thus, there is no difference between reachable distances of the signal light, which is caused by different transmission directions of the signal light. As a result, even in a case of signal light with different transmission directions, bidirectional communication using a single multi-core optical fiber amplifier is achieved. Moreover, with the optical amplification device 1000 according to the present example embodiment, the transmission direction of the signal light differs for each of the cores, hence crosstalk between the cores can be suppressed. Thus, optical signal distortion due to crosstalk between the cores can be suppressed, and thereby a transmittable distance can be elongated as compared to a case in which each signal light propagates through all the cores in the same direction.

Next, an operation of the optical amplification device 1000 according to the present example embodiment is further described in detail.

Figure 4A:
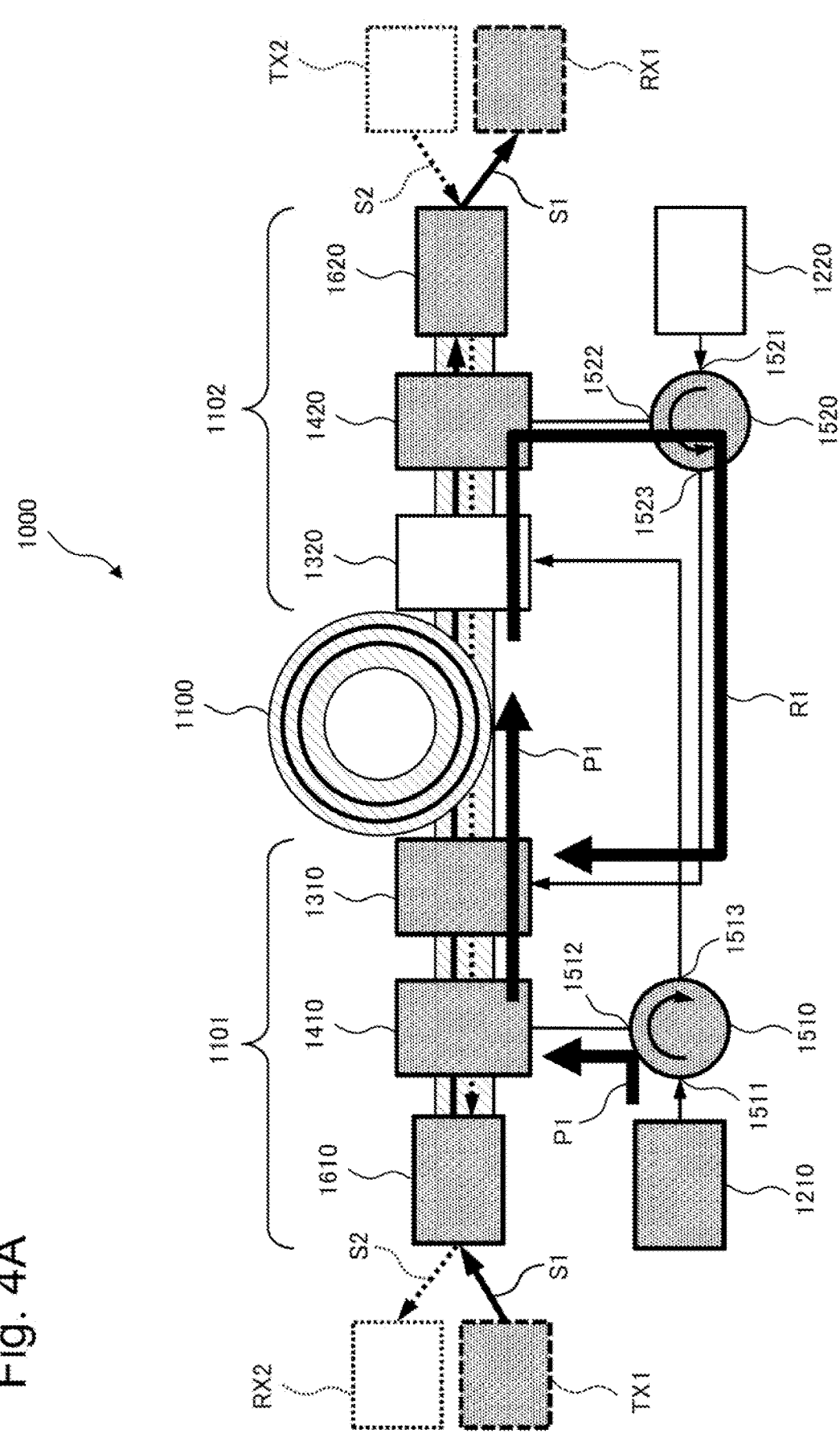
FIG. 4A is a diagram for describing an operation of the optical amplification device according to the second example embodiment of the present invention, with respect to first signal light.
Figure 4B:
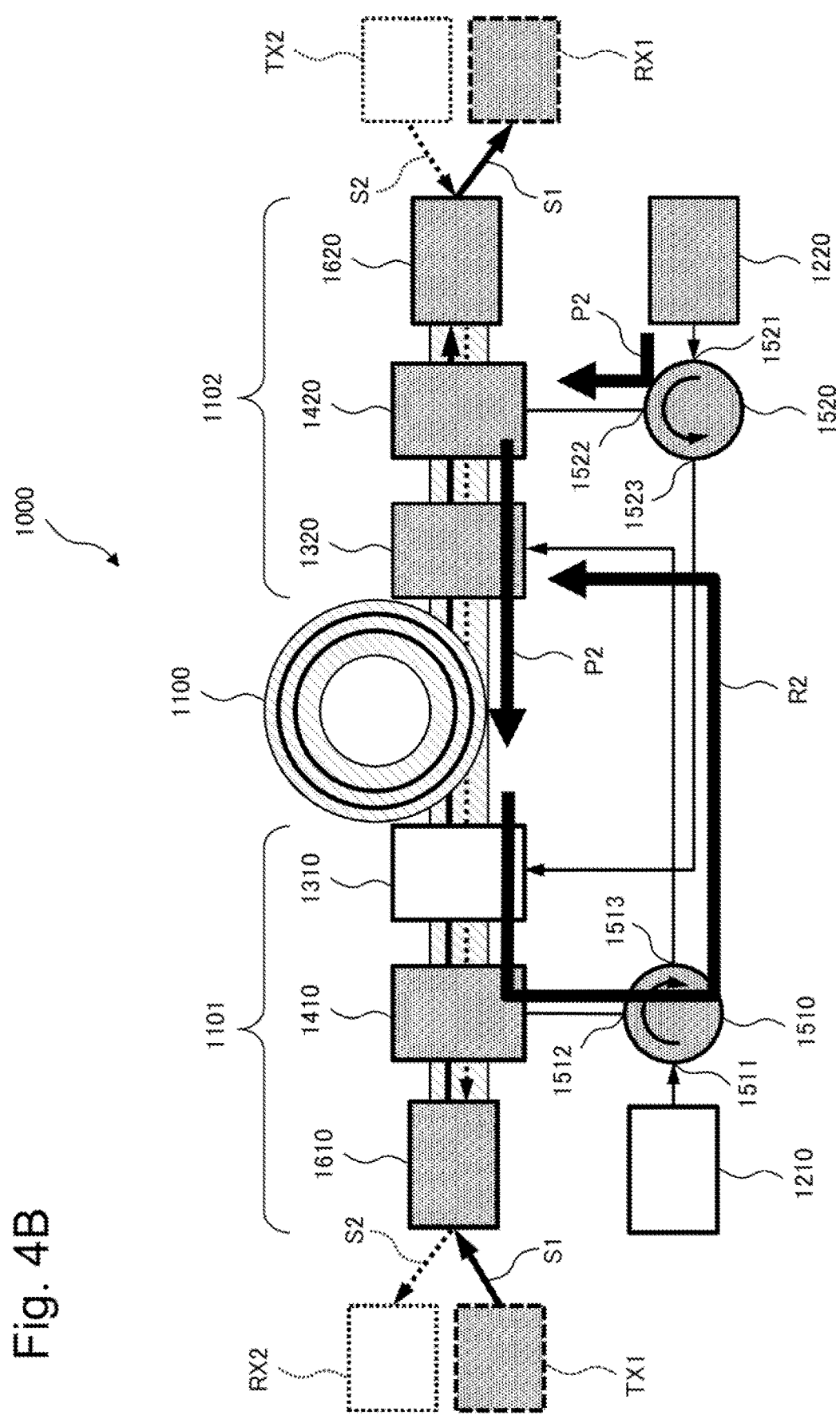
FIG. 4B is a diagram for describing another operation of the optical amplification device according to the second example embodiment of the present invention, with respect to the first signal light.

First, with reference to FIGS. 4A and 4B, description is made on an amplification operation performed for first signal light S1 propagating in the first direction from the first transmitter TX1 to the first optical receiver RX1.

As illustrated in FIG. 4A, first excitation light P1 generated by the first excitation laser 1210 is input to the first terminal 1511 of the first optical control unit 1510. The first optical control unit 1510 outputs the first excitation light P1 input from the first terminal 1511, to the first optical coupling/separating unit 1410 from the second terminal 1512. The first optical coupling/separating unit 1410 couples the first excitation light P1 to the multi-core erbium-doped fiber 1100 via the multi-core optical fiber 1101. An erbium ion added to each of the cores of the multi-core erbium-doped fiber 1100 is excited by the first excitation light P1, and thereby the first signal light S1 is amplified. In this case, both the propagation directions of the first signal light S1 and the first excitation light P1 are the first direction and are identical, hence the optical amplification device 1000 operates as an optical amplifier of a front excitation type.

First residual excitation light R1 of the first excitation light P1, which has not been absorbed by the multi-core erbium-doped fiber 1100, is output from the multi-core erbium-doped fiber 1100 together with the amplified first signal light S1, and is input to the second optical coupling/separating unit 1420. The second optical coupling/separating unit 1420 separates the first signal light and the first residual excitation light R1 from each other, and the first residual excitation light R1 is output to the second terminal 1522 of the second optical control unit 1520. The second optical control unit 1520 outputs the first residual excitation light R1 input from the second terminal 1522, to the first residual excitation light coupling unit 1310 from the third terminal 1523. The first residual excitation light coupling unit 1310 couples the first residual excitation light R1 to the multi-core erbium-doped fiber 1100. In this manner, the optical amplification device 1000 includes a regeneration path connected from the second optical coupling/separating unit 1420 to the first residual excitation light coupling unit 1310. With this regeneration path being provided, the first residual excitation light R1 can be regenerated and reused.

Meanwhile, as illustrated in FIG. 4B, second excitation light P2 generated by the second excitation laser 1220 is input to the first terminal 1521 of the second optical control unit 1520. The second optical control unit 1520 outputs the second excitation light P2 input from the first terminal 1521, to the second optical coupling/separating unit 1420 from the second terminal 1522. The second optical coupling/separating unit 1420 couples the second excitation light P2 to the multi-core erbium-doped fiber 1100 via the multi-core optical fiber 1102. An erbium ion added to each of the cores of the multi-core erbium-doped fiber 1100 is excited by the second excitation light P2, and thus the first signal light S1 is amplified. In this case, the propagation direction of the second excitation light P2 is a direction opposite to the propagation direction of the first signal light S1, hence the optical amplification device 1000 operates as an optical amplifier of a rear excitation type.

Second residual excitation light R2 of the second excitation light P2, which has not been absorbed by the multi-core erbium-doped fiber 1100, is output from the multi-core erbium-doped fiber 1100 together with amplified second signal light S2, and is input to the first optical coupling/separating unit 1410. The first optical coupling/separating unit 1410 separates the second signal light and the second residual excitation light R2 from each other, and outputs the second residual excitation light R2 to the second terminal 1512 of the first optical control unit 1510. The first optical control unit 1510 outputs the second residual excitation light R2 input from the second terminal 1512, to the second residual excitation light coupling unit 1320 from the third terminal 1513. The second residual excitation light coupling unit 1320 couples the second residual excitation light R2 to the multi-core erbium-doped fiber 1100. In this manner, the optical amplification device 1000 includes a regeneration path connected from the first optical coupling/separating unit 1410 to the second residual excitation light coupling unit 1320. With this regeneration path being provided, the second residual excitation light R2 can be regenerated and reused.

As described above, the optical amplification device 1000 according to the present example embodiment supplies the excitation light to the multi-core erbium-doped fiber 1100 in directions same as and opposite to the propagation direction of the first signal light S1. Therefore, the optical amplification device 1000 operates as an optical amplifier of a bidirectional excitation type for the first signal light S1 propagating in the first direction.

Figure 5A:
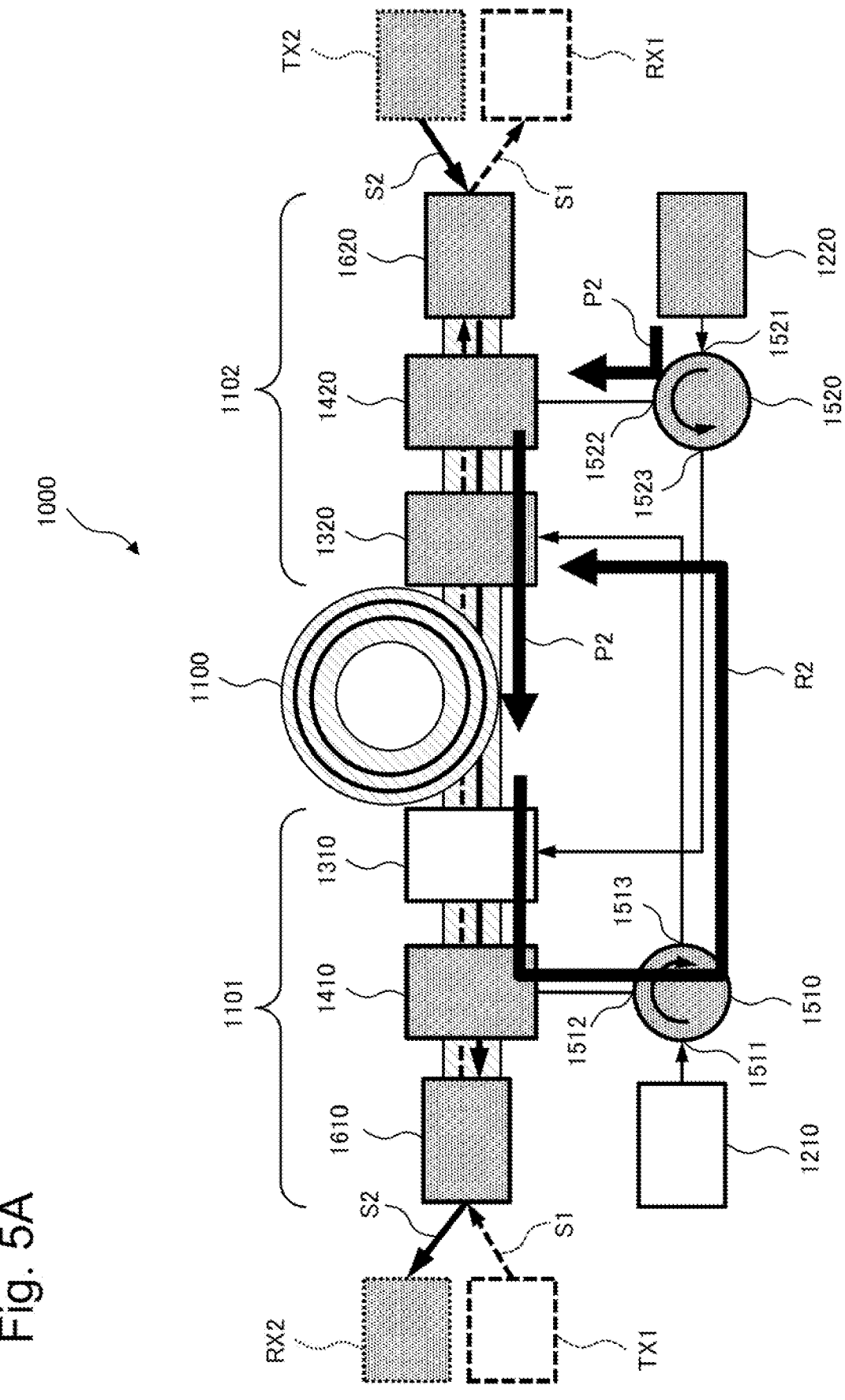
FIG. 5A is a diagram for describing an operation of the optical amplification device according to the second example embodiment of the present invention, with respect to second signal light.
Figure 5B:
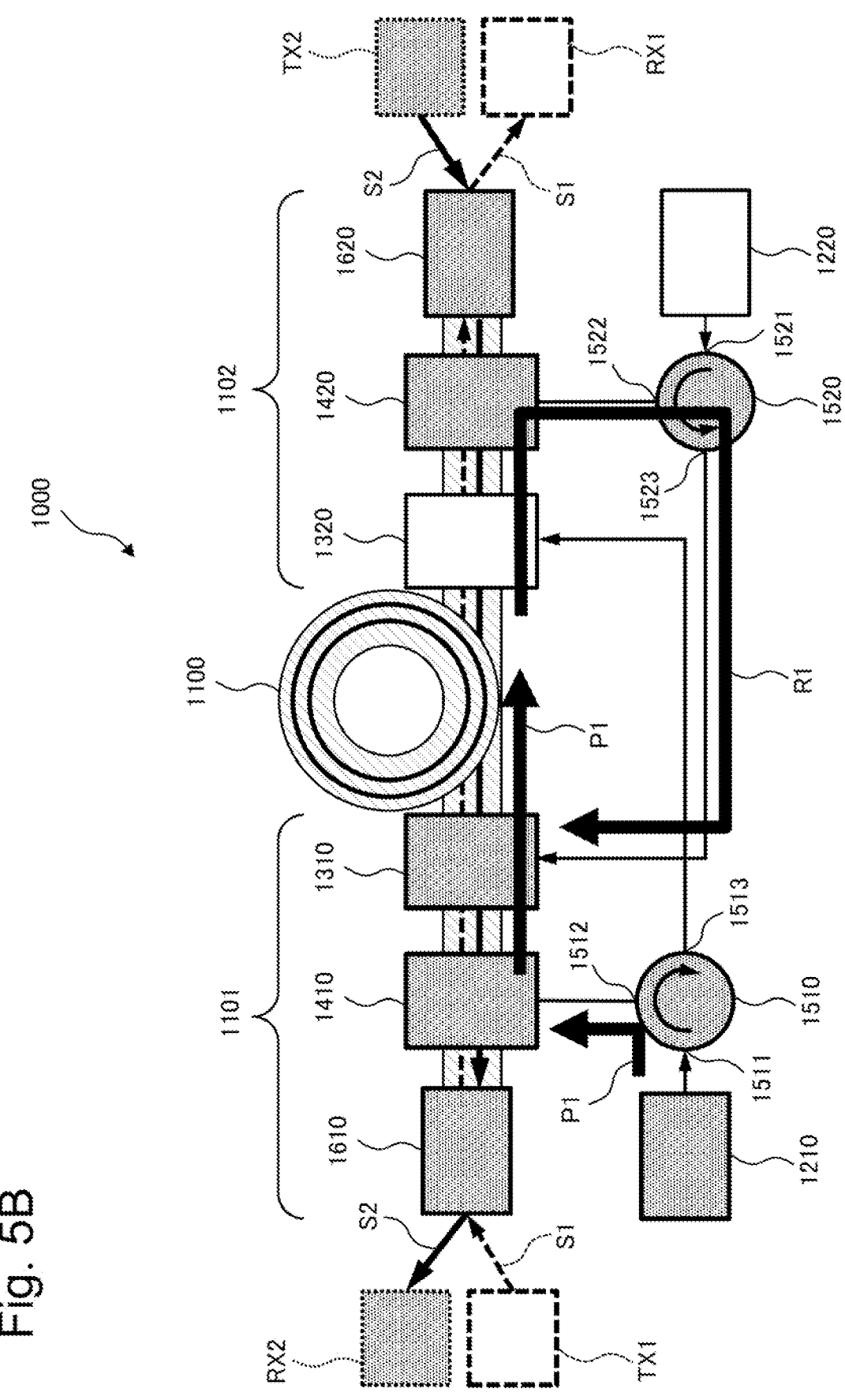
FIG. 5B is a diagram for describing another operation of the optical amplification device according to the second example embodiment of the present invention, with respect to the second signal light.

Next, with reference to FIGS. 5A and 5B, description is made on an amplification operation performed for second signal light S2 propagating in the second direction from the second transmitter TX2 to the second optical receiver RX2.

As illustrated in FIG. 5A, the second excitation light P2 generated by the second excitation laser 1220 is input to the first terminal 1521 of the second optical control unit 1520. The second optical control unit 1520 outputs the second excitation light P2 input from the first terminal 1521, to the second optical coupling/separating unit 1420 from the second terminal 1522. The second optical coupling/separating unit 1420 couples the second excitation light P2 to the multi-core erbium-doped fiber 1100 via the multi-core optical fiber 1102. An erbium ion added to each of the cores of the multi-core erbium-doped fiber 1100 is excited by the second excitation light P2, and thus the second signal light S2 is amplified. In this case, both the propagation directions of the second signal light S2 and the second excitation light P2 are the second direction and the same, hence the optical amplification device 1000 operates as an optical amplifier of a front excitation type.

The second residual excitation light R2 of the second excitation light P2, which has not been absorbed by the multi-core erbium-doped fiber 1100, is output from the multi-core erbium-doped fiber 1100 together with the amplified second signal light S2, and is input to the first optical coupling/separating unit 1410. The first optical coupling/separating unit 1410 separates the second signal light and the second residual excitation light R2 from each other, and the second residual excitation light R2 is output to the second terminal 1512 of the first optical control unit 1510. The first optical control unit 1510 outputs the second residual excitation light R2 input from the second terminal 1512, to the second residual excitation light coupling unit 1320 from the third terminal 1513. The second residual excitation light coupling unit 1320 couples the second residual excitation light R2 to the multi-core erbium-doped fiber 1100. In this manner, the optical amplification device 1000 includes a regeneration path connected from the first optical coupling/separating unit 1410 to the second residual excitation light coupling unit 1320. With this regeneration path being provided, the second residual excitation light R2 can be regenerated and reused.

Meanwhile, as illustrated in FIG. 5B, the first excitation light P1 generated by the first excitation laser 1210 is input to the first terminal 1511 of the first optical control unit 1510. The first optical control unit 1510 outputs the first excitation light P1 input from the first terminal 1511, to the first optical coupling/separating unit 1410 from the second terminal 1512. The first optical coupling/separating unit 1410 couples the first excitation light P1 to the multi-core erbium-doped fiber 1100 via the multi-core optical fiber 1101. An erbium ion added to each of the cores of the multi-core erbium-doped fiber 1100 is excited by the first excitation light P1, and thus the second signal light S2 is amplified. In this case, the propagation direction of the first excitation light P1 is a direction opposite to the propagation direction of the second signal light S2, hence the optical amplification device 1000 operates as an optical amplifier of a rear excitation type.

The first residual excitation light R1 of the first excitation light P1, which has not been absorbed by the multi-core erbium-doped fiber 1100, is output from the multi-core erbium-doped fiber 1100 together with the amplified first signal light S1, and is input to the second optical coupling/separating unit 1420. The second optical coupling/separating unit 1420 separates the first signal light and the first residual excitation light R1 from each other, and the first residual excitation light R1 is output to the second terminal 1522 of the second optical control unit 1520. The second optical control unit 1520 outputs the first residual excitation light R1 input from the second terminal 1522, to the first residual excitation light coupling unit 1310 from the third terminal 1523. The first residual excitation light coupling unit 1310 couples the first residual excitation light R1 to the multi-core erbium-doped fiber 1100. In this manner, the optical amplification device 1000 includes a regeneration path connected from the second optical coupling/separating unit 1420 to the first residual excitation light coupling unit 1310. With this regeneration path being provided, the first residual excitation light R1 can be regenerated and reused.

As described above, the optical amplification device 1000 according to the present example embodiment supplies the excitation light to the multi-core erbium-doped fiber 1100 in directions same as and opposite to the propagation direction of the second signal light S2. Therefore, the optical amplification device 1000 operates as an optical amplifier of a bidirectional excitation type even for the second signal light S2 propagating in the second direction.

In this manner, the optical amplification device 1000 according to the present example embodiment operates as an optical amplifier of a bidirectional excitation type for forward transmission signal light that propagates in the same direction as the propagation direction of the excitation light and for backward transmission signal light that propagates in a direction opposite to the propagation direction of the excitation light. Therefore, with the optical amplification device 1000 according to the present example embodiment, an optical transmission system optimal for any signal light with different transmission directions can be established. Moreover, the residual excitation light is regenerated in a bidirectional manner, and thus optical amplification can be efficiently performed.

Next, an optical amplification method according to the present example embodiment is described.

First, in the optical amplification method according to the present example embodiment, signal light is introduced into a plurality of optical transmission paths containing an optical amplification medium having a gain in the wavelength band of the signal light. Further, excitation light that excites an optical amplification medium is introduced into the plurality of optical transmission paths from both ends of the plurality of optical transmission paths. Further, residual excitation light being output from both the ends of the plurality of optical transmission paths and has the wavelength component of the excitation light is introduced into the plurality of optical transmission paths.

Introduction of the signal light to the plurality of optical transmission paths, which is described above, may involve introduction of a first signal light among the signal light, to a first optical transmission path included in the plurality of optical transmission paths from a first end of the plurality of optical transmission paths. Moreover, the configuration may involve introduction of a second signal light among the signal light, to a second optical transmission path included in the plurality of optical transmission paths from a second end of the plurality of optical transmission paths.

Introduction of the excitation light to the plurality of optical transmission paths, which is described above, may involve introduction of a first excitation light, which excites the optical amplification medium, from the first end of the plurality of optical transmission paths and introduction of a second excitation light, which excites the optical amplification medium, from the second end of the plurality of optical transmission paths.

Introduction of the residual excitation light to the plurality of optical transmission paths, which is described above, may involve introduction of a first residual excitation light, which is output from the second end of the plurality of optical transmission paths and has the wavelength component of the first excitation light, from the first end to the plurality of optical transmission paths. Further, introduction of the residual excitation light to the plurality of optical transmission paths may involve introduction of a second residual excitation light, which is output from the first end of the plurality of optical transmission paths and has the wavelength component of the second excitation light, from the second end to the plurality of optical transmission paths.

Note that, introduction of the signal light to the plurality of optical transmission paths, which is described above, may involve introduction of a signal light to a multi-core optical fiber including a plurality of optical transmission paths formed of a double-clad structure and a plurality of cores to which a rare-earth ion is added. Further, introduction of the excitation light to the plurality of optical transmission paths may involve introduction of an excitation light to the plurality of optical transmission paths by the clad excitation method.

The configuration described so far is similar to the optical amplification method according to the first example embodiment. In the optical amplification method according to the present example embodiment, introduction of the first excitation light to the plurality of optical transmission paths involves generation of the first excitation light and coupling of the first excitation light to the plurality of optical transmission paths. Further, introduction of the second excitation light to the plurality of optical transmission paths involves generation of the second excitation light and coupling of the second excitation light to the plurality of optical transmission paths.

Further, introduction of the first residual excitation light to the plurality of optical transmission paths may involve separation between the first signal light and the first residual excitation light and coupling of the first residual excitation light to the plurality of optical transmission paths. Further, introduction of the second residual excitation light to the plurality of optical transmission paths may involve separation between the second signal light and the second residual excitation light and coupling of the second residual excitation light to the plurality of optical transmission paths.

As described above, with the optical amplification device 1000 and the optical amplification method according to the present example embodiment, even when an optical amplification device including a plurality of optical transmission paths is used in bidirectional communication, an optical transmission system optimal for any signal light with different transmission directions can be established. Moreover, residual excitation light is regenerated in a bidirectional manner, and thus optical amplification can be efficiently performed.

The whole or part of the example embodiments disclosed above can be described as, but not limited to, the following supplementary notes.

Supplementary Note 1

An optical amplification device, including an optical waveguiding means including a plurality of optical transmission paths containing an optical amplification medium having a gain in a wavelength band of signal light, an excitation light introducing means for introducing, to the optical waveguiding means, excitation light that excites the optical amplification medium, from both ends of the optical waveguiding means, and a residual excitation light introducing means for introducing, to the optical waveguiding means, residual excitation light being output from both the ends of the optical waveguiding means and having a wavelength component of the excitation light.

Supplementary Note 2

The optical amplification device according to supplementary note 1, wherein the plurality of optical transmission paths include a first optical transmission path in which first signal light among the signal light propagates in a first direction from a first end to a second end of the optical waveguiding means, and a second optical transmission path in which second signal light among the signal light propagates in a second direction from the second end to the first end of the optical waveguiding means.

Supplementary Note 3

The optical amplification device according to supplementary note 2, wherein the excitation light introducing means includes a first excitation light introducing means for introducing, to the optical waveguiding means, first excitation light that excites the optical amplification medium, from the first end of the optical waveguiding means, and a second excitation light introducing means for introducing, to the optical waveguiding means, second excitation light that excites the optical amplification medium, from the second end of the optical waveguiding means, and the residual excitation light introducing means includes a first residual excitation light introducing means for introducing, to the optical waveguiding means from the first end, first residual excitation light being output from the second end of the optical waveguiding means and having a wavelength component of the first excitation light, and a second residual excitation light introducing means for introducing, to the optical waveguiding means from the second end, second residual excitation light being output from the first end of the optical waveguiding means and having a wavelength component of the second excitation light.

Supplementary Note 4

The optical amplification device according to supplementary note 3, wherein the first excitation light introducing means includes a first excitation light generating means for generating the first excitation light, and a first optical coupling means for coupling the first excitation light to the optical waveguiding means, the second excitation light introducing means includes a second excitation light generating means for generating the second excitation light, and a second optical coupling means for coupling the second excitation light to the optical waveguiding means, the first residual excitation light introducing means includes a first residual excitation light coupling means for coupling the first residual excitation light to the optical waveguiding means, on a side close to the first end, and a first residual excitation light separating means for separating the first signal light and the first residual excitation light from each other, on a side close to the second end, and the second residual excitation light introducing means includes a second residual excitation light coupling means for coupling the second residual excitation light to the optical waveguiding means, on a side close to the second end, and a second residual excitation light separating means for separating the second signal light and the second residual excitation light from each other, on a side close to the first end.

Supplementary Note 5

The optical amplification device according to supplementary note 4, wherein the first excitation light introducing means and the second residual excitation light introducing means further include a first optical control means, and the first optical control means includes a first terminal to which the first excitation light is input, a second terminal from which the first excitation light is output and to which the second residual excitation light is input, and a third terminal from which the second residual excitation light is output.

Supplementary Note 6

The optical amplification device according to supplementary note 4, wherein the second excitation light introducing means and the first residual excitation light introducing means further include a second optical control means, and the second optical control means includes a first terminal to which the second excitation light is input, a second terminal from which the second excitation light is output and to which the first residual excitation light is input, and a third terminal from which the first residual excitation light is output.

Supplementary Note 7

The optical amplification device according to any one of supplementary notes 4 to 6, wherein each of the first optical coupling means, the second optical coupling means, the first residual excitation light separating means, and the second residual excitation light separating means is an optical coupling/separating means of a space propagation type including a space optical system, and each of the first residual excitation light coupling means and the second residual excitation light coupling means is a residual excitation light coupling means of an optical waveguiding type.

Supplementary Note 8

The optical amplification device according to supplementary note 7, wherein the optical coupling/separating means includes a dichroic mirror, and the residual excitation light coupling means includes an excitation light combiner.

Supplementary Note 9

The optical amplification device according to any one of supplementary notes 1 to 8, wherein the optical amplification medium is formed of a plurality of cores to which a rare-earth ion is added, the optical waveguiding means includes a multi-core optical fiber including the plurality of optical transmission paths formed of the plurality of cores and a double-clad structure, and the excitation light introducing means introduces the excitation light to the optical waveguiding means by a clad excitation method.

Supplementary Note 10

An optical amplification method, including introducing signal light to a plurality of optical transmission paths containing an optical amplification medium having a gain in a wavelength band of the signal light, introducing, to the plurality of optical transmission paths, excitation light that excites the optical amplification medium, from both ends of the plurality of optical transmission paths, and introducing, to the plurality of optical transmission paths, residual excitation light being output from both the ends of the plurality of optical transmission paths and having a wavelength component of the excitation light.

Supplementary Note 11

The optical amplification method according to supplementary note 10, wherein the introducing the signal light to the plurality of optical transmission paths includes introducing first signal light among the signal light to a first optical transmission path included in the plurality of optical transmission paths, from a first end of the plurality of optical transmission paths, and introducing second signal light among the signal light to a second transmission path included in the plurality of optical transmission paths, from a second end of the plurality of optical transmission paths.

Supplementary Note 12

The optical amplification method according to supplementary note 11, wherein the introducing the excitation light to the plurality of optical transmission paths includes introducing first excitation light that excites the optical amplification medium, from the first end of the plurality of optical transmission paths, and introducing second excitation light that excites the optical amplification medium, from the second end of the plurality of optical transmission paths, and the introducing the residual excitation light to the plurality of optical transmission paths includes introducing, to the plurality of optical transmission paths from the first end, first residual excitation light being output from the second end of the plurality of optical transmission paths and having a wavelength component of the first excitation light, and introducing, to the plurality of optical transmission paths, from the second end, second residual excitation light being output from the first end of the plurality of optical transmission paths and having a wavelength component of the second excitation light.

Supplementary Note 13

The optical amplification method according to supplementary note 12, wherein the introducing the first excitation light to the plurality of optical transmission paths includes generating the first excitation light and coupling the first excitation light to the plurality of optical transmission paths, and the introducing the second excitation light to the plurality of optical transmission paths includes generating the second excitation light and coupling the second excitation light to the plurality of optical transmission paths.

Supplementary Note 14

The optical amplification method according to supplementary note 13, wherein the introducing the first excitation light to the plurality of optical transmission paths includes coupling the first excitation light to the plurality of optical transmission paths by a space optical system, and the introducing the second excitation light to the plurality of optical transmission paths includes coupling the second excitation light to the plurality of optical transmission paths by a space optical system.

Supplementary Note 15

The optical amplification method according to supplementary note 12, wherein the introducing the first residual excitation light to the plurality of optical transmission paths includes separating the first signal light and the first residual excitation light from each other and coupling the first residual excitation light to the plurality of optical transmission paths, and the introducing the second residual excitation light to the plurality of optical transmission paths includes separating the second signal light and the second residual excitation light from each other and coupling the second residual excitation light to the plurality of optical transmission paths.

Supplementary Note 16

The optical amplification method according to supplementary note 15, wherein the introducing the first residual excitation light to the plurality of optical transmission paths includes separating the first signal light and the first residual excitation light from each other by a space optical system and coupling the first residual excitation light to the plurality of optical transmission paths by an optical waveguide, and the introducing the second residual excitation light to the plurality of optical transmission paths includes separating the second signal light and the second residual excitation light from each other by a space optical system and coupling the second residual excitation light to the plurality of optical transmission paths by an optical waveguide.

Supplementary Note 17

The optical amplification method according to any one of supplementary notes 10 to 16, wherein the introducing the signal light to the plurality of optical transmission paths includes introducing the signal light to a multi-core optical fiber including the plurality of optical transmission paths formed of a plurality of cores to which a rare-earth ion is added and a double-clad structure, and the introducing the excitation light to the plurality of optical transmission paths includes introducing the excitation light to the plurality of optical transmission paths by a clad excitation method.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100, 1000 Optical amplification device
110 Optical waveguiding unit
111 First end
112 Second end
120 Excitation light introducing unit
121 First excitation light introducing unit
122 Second excitation light introducing unit
130 Residual excitation light introducing unit
131 First residual excitation light introducing unit
132 Second residual excitation light introducing unit
1100 Multi-core erbium-doped fiber
1101, 1102 Multi-core optical fiber
1210 First excitation laser
1220 Second excitation laser
1310 First residual excitation light coupling unit
1320 Second residual excitation light coupling unit
1410 First optical coupling/separating unit
1420 Second optical coupling/separating unit
1510 First optical control unit
1511, 1521 First terminal
1512, 1522 Second terminal
1513, 1523 Third terminal
1520 Second optical control unit
1610 First fan-in/fan-out
1620 Second fan-in/fan-out

What is claimed is:

1. An optical amplification device comprising:

an optical waveguiding unit including a plurality of optical transmission paths containing an optical amplification medium having a gain in a wavelength band of signal light;

an excitation light introducing unit configured to introduce, to the optical waveguiding unit, excitation light that excites the optical amplification medium, from both ends of the optical waveguiding unit; and a residual excitation light introducing unit configured to introduce, to the optical waveguiding unit, residual excitation light being output from both the ends of the optical waveguiding unit and having a wavelength component of the excitation light, wherein the optical amplification medium is formed of a plurality of cores to which a rare-earth ion is added, and the optical waveguiding unit includes a multi-core optical fiber including the plurality of optical transmission paths formed of the plurality of cores.

2. The optical amplification device according to claim 1, wherein the plurality of optical transmission paths include:

a first optical transmission path in which first signal light among the signal light propagates in a first direction from a first end to a second end of the optical waveguiding unit; and a second optical transmission path in which second signal light among the signal light propagates in a second direction from the second end to the first end of the optical waveguiding unit.

3. The optical amplification device according to claim 2, wherein the excitation light introducing unit includes:

a first excitation light introducing unit configured to introduce, to the optical waveguiding unit, first excitation light that excites the optical amplification medium, from the first end of the optical waveguiding unit; and a second excitation light introducing unit configured to introduce, to the optical waveguiding unit, second excitation light that excites the optical amplification medium, from the second end of the optical waveguiding unit, and the residual excitation light introducing unit includes:

a first residual excitation light introducing unit configured to introduce, to the optical waveguiding unit from the first end, first residual excitation light being output from the second end of the optical waveguiding unit and having a wavelength component of the first excitation light; and a second residual excitation light introducing unit configured to introduce, to the optical waveguiding unit from the second end, second residual excitation light being output from the first end of the optical waveguiding unit and having a wavelength component of the second excitation light.

4. The optical amplification device according to claim 2, wherein the multi-core optical fiber is formed of a double-clad structure, and the excitation light introducing unit introduces the excitation light to the optical waveguiding unit by a clad excitation method.

5. The optical amplification device according to claim 1, wherein the multi-core optical fiber is formed of a double-clad structure, and the excitation light introducing unit introduces the excitation light to the optical waveguiding unit by a clad excitation method.

6. The optical amplification device according to claim 3, wherein the first excitation light introducing unit includes:

a first excitation light generating unit configured to generate the first excitation light; and a first optical coupling unit configured to couple the first excitation light to the optical waveguiding unit, the second excitation light introducing unit includes:

a second excitation light generating unit configured to generate the second excitation light; and a second optical coupling unit configured to couple the second excitation light to the optical waveguiding unit, the first residual excitation light introducing unit includes a first residual excitation light coupling unit configured to couple the first residual excitation light to the optical waveguiding unit, on a side close to the first end, and a first residual excitation light separating unit configured to separate the first signal light and the first residual excitation light from each other, on a side close to the second end, and the second residual excitation light introducing unit includes a second residual excitation light coupling unit configured to couple the second residual excitation light to the optical waveguiding unit, on a side close to the second end, and a second residual excitation light separating unit configured to separate the second signal light and the second residual excitation light from each other, on a side close to the first end.

7. The optical amplification device according to claim 6, wherein the first excitation light introducing unit and the second residual excitation light introducing unit further include a first optical control unit, and the first optical control unit includes a first terminal to which the first excitation light is input, a second terminal from which the first excitation light is output and to which the second residual excitation light is input, and a third terminal from which the second residual excitation light is output.

8. The optical amplification device according to claim 6, wherein the second excitation light introducing unit and the first residual excitation light introducing unit further include a second optical control unit, and the second optical control unit includes a first terminal to which the second excitation light is input, a second terminal from which the second excitation light is output and to which the first residual excitation light is input, and a third terminal from which the first residual excitation light is output.

9. The optical amplification device according to claim 6, wherein each of the first optical coupling unit, the second optical coupling unit, the first residual excitation light separating unit, and the second residual excitation light separating unit is an optical coupling/separating unit of a space propagation type including a space optical system, and each of the first residual excitation light coupling unit and the second residual excitation light coupling unit is a residual excitation light coupling unit of an optical waveguiding type.

10. The optical amplification device according to claim 7, wherein each of the first optical coupling unit, the second optical coupling unit, the first residual excitation light separating unit, and the second residual excitation light separating unit is an optical coupling/separating unit of a space propagation type including a space optical system, and each of the first residual excitation light coupling unit and the second residual excitation light coupling unit is a residual excitation light coupling unit of an optical waveguiding type.

11. The optical amplification device according to claim 8, wherein each of the first optical coupling unit, the second optical coupling unit, the first residual excitation light separating unit, and the second residual excitation light separating unit is an optical coupling/separating unit of a space propagation type including a space optical system, and each of the first residual excitation light coupling unit and the second residual excitation light coupling unit is a residual excitation light coupling unit of an optical waveguiding type.

12. The optical amplification device according to claim 9, wherein the optical coupling/separating unit includes a dichroic mirror, and the residual excitation light coupling unit includes an excitation light combiner.

13. An optical amplification method comprising:

introducing signal light to a plurality of optical transmission paths containing an optical amplification medium having a gain in a wavelength band of the signal light;

introducing, to the plurality of optical transmission paths, excitation light that excites the optical amplification medium, from both ends of the plurality of optical transmission paths; and introducing, to the plurality of optical transmission paths, residual excitation light being output from both the ends of the plurality of optical transmission paths and having a wavelength component of the excitation light, wherein the introducing the signal light to the plurality of optical transmission paths includes introducing the signal light to a multi-core optical fiber including the plurality of optical transmission paths formed of a plurality of cores to which a rare-earth ion is added.

14. The optical amplification method according to claim 13, wherein the introducing the signal light to the plurality of optical transmission paths includes:

introducing first signal light among the signal light to a first optical transmission path included in the plurality of optical transmission paths, from a first end of the plurality of optical transmission paths; and introducing second signal light among the signal light to a second transmission path included in the plurality of optical transmission paths, from a second end of the plurality of optical transmission paths.

15. The optical amplification method according to claim 13, wherein the multi-core optical fiber is formed of a double-clad structure, and the introducing the excitation light to the plurality of optical transmission paths includes introducing the excitation light to the plurality of optical transmission paths by a clad excitation method.

16. The optical amplification method according to claim 14, wherein the introducing the excitation light to the plurality of optical transmission paths includes:

introducing first excitation light that excites the optical amplification medium, from the first end of the plurality of optical transmission paths; and introducing second excitation light that excites the optical amplification medium, from the second end of the plurality of optical transmission paths, and the introducing the residual excitation light to the plurality of optical transmission paths includes:

introducing, to the plurality of optical transmission paths from the first end, first residual excitation light being output from the second end of the plurality of optical transmission paths and having a wavelength component of the first excitation light; and introducing, to the plurality of optical transmission paths from the second end, second residual excitation light being output from the first end of the plurality of optical transmission paths and having a wavelength component of the second excitation light.

17. The optical amplification method according to claim 16, wherein the introducing the first excitation light to the plurality of optical transmission paths includes generating the first excitation light and coupling the first excitation light to the plurality of optical transmission paths, and the introducing the second excitation light to the plurality of optical transmission paths includes generating the second excitation light and coupling the second excitation light to the plurality of optical transmission paths.

18. The optical amplification method according to claim 16, wherein the introducing the first residual excitation light to the plurality of optical transmission paths includes separating the first signal light and the first residual excitation light from each other and coupling the first residual excitation light to the plurality of optical transmission paths, and the introducing the second residual excitation light to the plurality of optical transmission paths includes separating the second signal light and the second residual excitation light from each other and coupling the second residual excitation light to the plurality of optical transmission paths.

19. The optical amplification method according to claim 17, wherein the introducing the first excitation light to the plurality of optical transmission paths includes coupling the first excitation light to the plurality of optical transmission paths by a space optical system, and the introducing the second excitation light to the plurality of optical transmission paths includes coupling the second excitation light to the plurality of optical transmission paths by a space optical system.

20. The optical amplification method according to claim 18, wherein the introducing the first residual excitation light to the plurality of optical transmission paths includes separating the first signal light and the first residual excitation light from each other by a space optical system and coupling the first residual excitation light to the plurality of optical transmission paths by an optical waveguide, and the introducing the second residual excitation light to the plurality of optical transmission paths includes separating the second signal light and the second residual excitation light from each other by a space optical system and coupling the second residual excitation light to the plurality of optical transmission paths by an optical waveguide.

* * * * *